United States Patent [19]
Alquist et al.

[11] Patent Number: 5,717,990
[45] Date of Patent: Feb. 17, 1998

[54] PROTECTIVE GARMENT WITH STAND-OFF HOOD

[76] Inventors: Patricia L. Alquist; Laura-Jean Hallman, both of P.O. Box 139, Stillwater, Me. 04489

[21] Appl. No.: 655,980

[22] Filed: May 31, 1996

[51] Int. Cl.⁶ ............................................. A42B 1/04
[52] U.S. Cl. ............................................. 2/4; 2/84; 2/202
[58] Field of Search ............................ 2/2.5, 4, 84, 202, 2/205, 456, 203

[56] References Cited

U.S. PATENT DOCUMENTS

| | | |
|---|---|---|
| 312,471 | 2/1885 | Holden .................................. 2/4 |
| 2,344,811 | 3/1944 | Gill ........................................ 2/4 |
| 5,091,993 | 3/1992 | Merrill et al. ........................ 2/84 |

Primary Examiner—Diana Biefeld
Attorney, Agent, or Firm—Chris A. Caseiro; Thomas L. Bohan

[57] ABSTRACT

A protective garment designed to shield a wearer from insects. The garment includes a protective hood that may be attached to a body-covering piece of the garment, or that may be used separately. The body-covering section and the hood are fabricated substantially entirely of a see-through mesh material that is breathable but that prevents very small insects from entering. The hood includes a crown and a lower section that covers the face and sides and back of the head. The crown is fabricated with a plurality of crossing reinforcing strips designed to cause the lower section of the hood to stand off from the wearer's face.

17 Claims, 2 Drawing Sheets

PROTECTIVE GARMENT WITH STAND-OFF HOOD

BACKGROUND OF THE INVENTION

1. Field of the Invention

The present invention is related to clothing designed to protect an individual against insect attacks. More particularly, the present invention is directed to a see-through mesh garment including a body-covering portion and a hood portion. The hood is designed such that that portion covering a wearer's face does not come in direct contact with the face.

2. Description of the Prior Art

It is well known that insects of varying types have been bothersome to people wishing to perform activities outdoors. These insects can range from large flies, to mosquitoes, to very small bugs identified by various names including "no seeums." While individuals often apply insect repellant as a means to ward off insect attacks, such products are either not particularly effective, they wear off after a relatively short period of time, or some combination of the two. For that reason, clothing has been developed that is designed to act in the same manner as the see-through mesh netting often used for tent openings, baby walkers, and the like. This material is lightweight, it permits the user to place the garment directly over conventional clothing, and it further permits the user to observe his or her surroundings while remaining protected. The netting is simply sewn or otherwise joined together in shapes suitable for placement on the body. This mesh clothing may be a single piece covering a person from head to toe, or it may be formed in sections, such as a shirt-like top and a pants-like bottom. A head covering piece is also often part of the combination. Openings designed to permit the wearer to put the clothing on and take it off are generally closable with means such as zippers, hook and loop closure material available as VELCRO (TM), and the like.

A number of insect-repelling garments have been the subject of patent protection. U.S. Pat. No. 5,091,993 issued to Merrill et al. describes a garment having separate pants, shirt, and a hood permanently attached to the upper part of the shirt. The hood portion of the Merrill garment includes a complex stitching pattern apparently designed to create a cap at the front of the hood and to provide some sort of stability. This hood design is also apparently designed to ensure that the portion of the hood directly in the face of the wearer will not, in fact, come to rest on the wearer's face. That sort of occurrence can be extremely annoying, particularly when the user is sweaty. However, the Merrill technique for achieving that goal involves the use of more material and more effort to create than appears to be necessary. Further, the coupling of the hood to the upper shirt is apparently necessary to ensure that the front portion of the hood is kept away from the wearer's face. In that regard, the Merrill hood is not transferrable, or at least useable as a stand-alone warding-off garment.

U.S. Pat. No. 4,395,781 issued to Myers describes a protective garment that is unitary and that includes substantial portions of non-see-through material. The Myers garment includes a mesh face covering as part of the hood. This garment fails to address the need for a stand-off hood arrangement. U.S. Pat. No. 4,685,152 issued to Heare suffers from similar deficiencies. U.S. Pat. No. 5,119,510 issued to Schilling describes an insect-proof garment having a hood made of netting material and affixed to the upper portion of a jacket made of similar netting material. As with the other garments described, the Schilling garment fails to provide a suitable hood design that is capable of being used alone or with other types of insect-preventive clothing.

Therefore, what is needed is insect-preventive clothing useable over common clothing, and that is lightweight, see-through and designed so that it does not come to rest on the face of its wearer when it is in place. What is also needed is such clothing that is relatively simple to fabricate and that is not required to be directly coupled to supportive clothing in order to function properly. In particular, what is needed is a transferrable see-through hood formed to stand off from a wearer's face when the hood is in place.

SUMMARY OF THE INVENTION

It is an object of the present invention to provide insect-preventive clothing useable over common clothing, and that is lightweight, see-through and designed so that it does not come to rest on the face of its wearer when it is in place. It is also an object of the present invention to provide insect-preventive clothing that is relatively simple to fabricate and that is not required to be directly coupled to supportive clothing in order to function properly. Finally, it is an object of the present invention to provide a transferrable see-through hood formed to stand off from a wearer's face when the hood is in place.

These and other objectives are achieved in the present invention through the development of an insect-preventive garment that may include a shirt section, and/or a pant section, and that does include a hood. Substantially all of the garment is fabricated of fine-mesh flexible material that is porous enough to allow air through, but not porous enough to let small bugs through. The mesh is see-through so as to permit the wearer to observe his or her surroundings. Standard mesh materials commercially available may be used to form the noted sections of the present garment.

A key of the present invention is the formation of a mesh hood having a unique crown design. That is, the top of the hood is designed with a reinforcing arrangement that keeps the relatively flexible mesh netting preferably used to make the hood away from the wearer's face when the hood is deployed. The reinforcing arrangement includes two or more solid strips having some flexibility and arranged so that they intersect approximately at the peak of the crown. The strips are preferably formed of a relatively strong viscoelastic material, including, but not limited to, polyester, polyethylene, or polypropylene. The strips are of a thickness that permits them to be flexible yet not so flexible that they will droop and thereby cause the front portion of the hood to come in contact with the wearer's face.

The hood portion of the garment of the present invention may be formed in a variety of ways, provided, however, it includes the crossed reinforcing strips noted. In general, the hood comes in two basic sections, the crown section previously described, and a lower hood section. The lower hood section is designed to cover the wearer's face, ears, neck—that is, all but the top of the head. The two sections may be joined in any number of ways, including permanently and detachably. In the preferred embodiment of the invention, these sections are permanently joined by sewing them together. The bottom of the lower hood section may optionally be permanently joined to the shirt portion of the garment, it may be detachably joinable such as with a zipper or VELCRO (TM), or it may simply rest over the upper region of the shirt. In the latter arrangement, it can be seen that the hood of the present invention may be used with any protective garment, or it may be used alone.

The crown section of the hood is preferably formed by joining two disks of mesh material, substantially equal in size, together at their common perimeter. The reinforcing strips are placed between the two pieces prior to joining them together such that they are captured in the space between. The strips are then permanently attached to the mesh disks by well known means such as sewing. Prior to placing the strips between the disks, it is preferable to join them together in a crossing arrangement so as to ensure that the crown and the adjoining lower hood section will stand off from the user when deployed. The strips may be joined by gluing them together or otherwise coupling.

Through the design the described, the present invention creates a protective garment that is easy to fabricate and causes minimal intrusion to the wearer. Moreover, this design is not restricted to use with a specific garment top in that it does not have to be joined to that garment top. These and other advantages of the present invention will become apparent upon review of the accompanying drawings, the following detailed description, and the appended claims.

DETAILED DESCRIPTION OF THE PREFERRED EMBODIMENT

Figure 1:
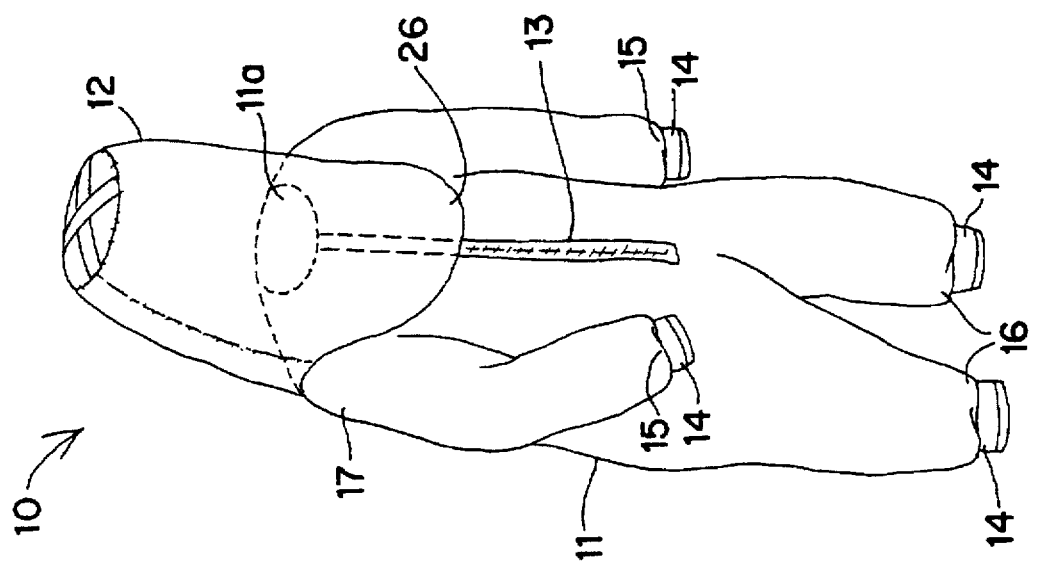
FIG. 1 is a perspective view of the garment of the present invention.

A protective garment 10 of the present invention is illustrated in FIG. 1. The garment includes a body-covering piece 11 and a hood 12. The body-covering piece 11 may be formed as a unitary piece having a zipper 13 for easy access to the piece 11. Alternatively, the piece 11 may be formed in two sections in a shirt-and-pants design (not shown). The garment 10 is preferably fabricated of a flexible mesh material similar to that used in the fabrication of tent netting and well known to those skilled in the art. The body-covering piece 11 may be formed of most any size, dependent upon the size of a wearer. Closing sections 14 at wrists 15 and ankles 16 of the garment 10 prevent insects from entering the garment 10 at those locations. The hood 12 may be designed to drape over the body-covering piece 11, as shown, or it may be permanently or detachably connected to an upper body piece section 17.

Figure 2:
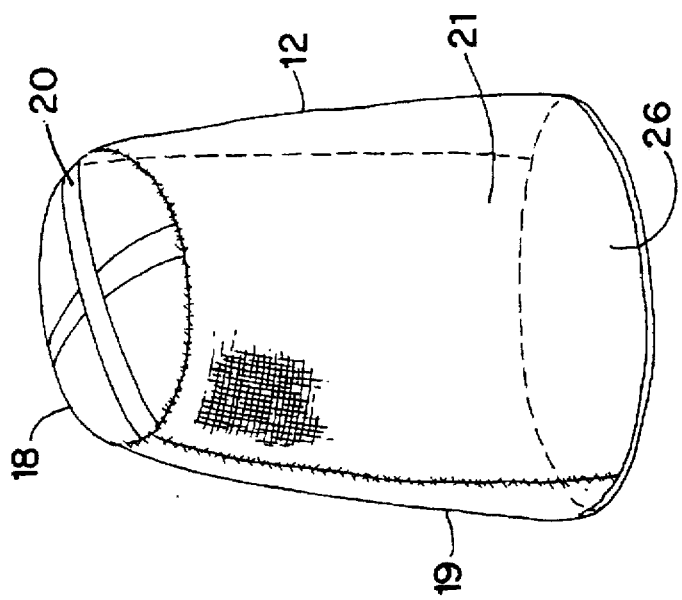
FIG. 2 is a perspective view of the hood of the present invention.

As illustrated in FIG. 2, the hood 12 is preferably independent and unitary as shown and includes a crown 18 and a lower hood section 19. The crown 18 is designed to rest on a wearer's head, and is attached to the lower hood section 19 so that the lower hood section 19 drapes around the wearer's head. An overlap section 26 of the lower hood section 19 preferably drapes below a neckline 11a of the body-covering piece 11 as clearly shown in FIG. 1. In this way, the wearer is protected on all sides. Reinforcing component 20 that forms part of the crown 18 ensures that a front hood section 21 does not come in contact with the wearer's face.

Figure 5:
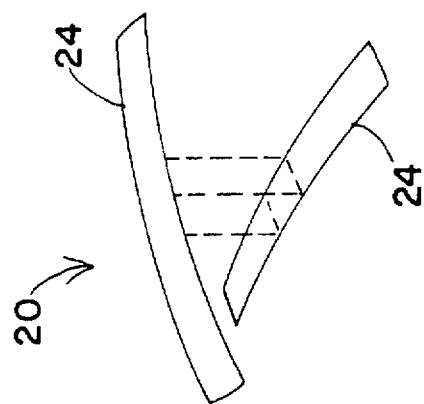
FIG. 5 is a perspective view of the arrangement of the reinforcing strips used in making the hood of the present invention.
Figure 4:
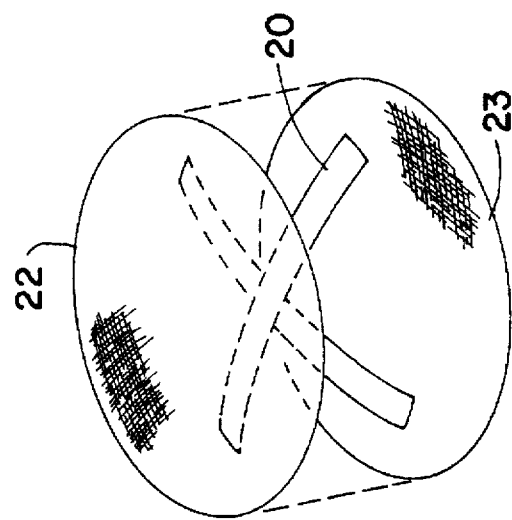
FIG. 4 is a perspective view of the arrangement of components used to form the crown of the hood of the present invention.
Figure 3:
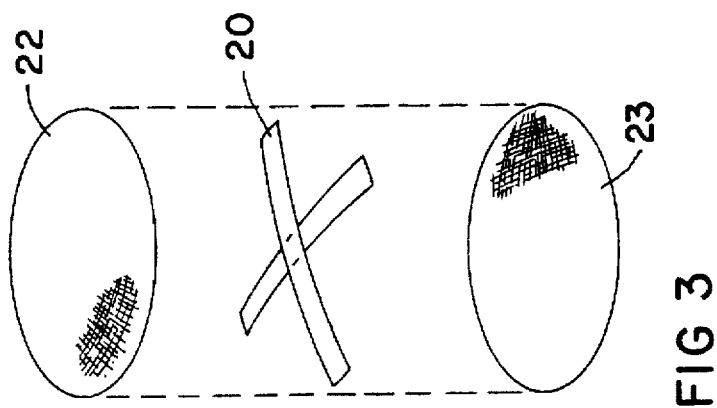
FIG. 3 is a top view of the components used to form the crown of the hood of the present invention.

As previously noted, a key feature of the present invention is the design of the crown 18 of the hood 12. The preferred arrangement of the components of the crown 18 is shown in FIGS. 3–5. In FIGS. 3 and 4 it can be seen that the crown 18 is formed by joining a first crown disk 22 with a second crown disk 23 of the crown 18 is shown in FIGS. 3–5. In FIGS. 3 and 4 it can be seen that the crown 18 is formed by joining a first crown disk 22 with a second crown disk 23 and placing therebetween the reinforcing component 20. The reinforcing component 20 is captured between the first disk 22 and the second disk 23 by sewing or otherwise joining those disks together. The reinforcing component 20 is preferably formed in the shape of a cross so as to minimize the amount of material used to form it while maximizing the structural reinforcement that it provides to the crown 18. It is further secured between disks 22 and 23 by joining it directly to those pieces such as by sewing it in place. In that way, the reinforcing component 20 will not shift its position.

As shown in FIG. 5, the reinforcing component 20 is fabricated by joining a plurality of reinforcing strips 24 together. The strips 24 are first joined together before deployment between the disks 22 and 23 by means of an adhesive, or by sewing. The strips 24 are fabricated as thin pieces of relatively strong viscoelastic material so that they have some flexibility while remaining structurally sufficient to keep the crown 18 from forming directly to the shape of the wearer's head. Preferably, the strips 24 are made of a solid woven polyester boning such as RIGILENE (TM). This arrangement allows the hood 12 to remain on the wearer's head without affecting motion, comfort, or visibility.

Although the present invention has been described with specificity, it is to be understood that modifications in materials and arrangement of components fall within the true scope of the invention. Therefore, such modifications and equivalents are deemed to be covered by the following claims.

We claim:

1. A protective garment to shield a wearer from insects, said garment comprising:
   a. a body-covering piece fabricated substantially entirely of a see-through mesh material; and
   b. a hood being unitary and independent from said body-covering piece, said hood including a lower hood section and a crown section attached thereto, wherein said lower hood section includes an overlap section and said crown section includes reinforcing means designed to cause said lower hood section to drape over a face of a wearer without contacting said face, said overlap section thereby extending substantially below a neckline of said body-covering piece, wherein said body-covering piece and said hood are detachably connected to one another.

2. The garment as claimed in claim 1 wherein said reinforcing means includes a plurality of reinforcing strips formed in a crossing pattern such that a center of said crossing pattern is aligned approximately with a center of a head of said wearer when said hood is deployed.

3. The garment as claimed in claim 2 wherein said reinforcing strips are fabricated of a solid woven polyester material.

4. The garment as claimed in claim 3 wherein there are two of said reinforcing strips.

5. The garment as claimed in claim 4 wherein said two reinforcing strips are joined together in the shape of a cross.

6. The garment as claimed in claim 5 wherein said two reinforcing strips are joined together with an adhesive.

7. The garment as claimed in claim 1 wherein said crown is formed of a first disk and a second disk joined together at a common perimeter, wherein said first disk and said second disk are fabricated of a see-through mesh material and are substantially equal in size, wherein said reinforcing means is captured between said first disk and said second disk.

8. The garment as claimed in claim 7 wherein said reinforcing means includes two reinforcing strips joined together in a cross pattern, wherein said reinforcing strips are fabricated of a solid woven polyester material.

9. The garment as claimed in claim 1 wherein said body-covering piece is fabricated as a unitary piece.

10. A protective hood to shield a wearer's head from insects, said hood comprising:

a. a lower hood section having an overlap section; and b. a crown section attached to an upper region of said lower hood section, wherein said crown section includes reinforcing means, wherein said hood is independent and unitary, wherein said reinforcing means includes a plurality of reinforcing strips formed in a crossing pattern such that a center of said crossing pattern is aligned approximately with a center of a head of said wearer when said hood is deployed, and wherein said reinforcing strips are fabricated of a polyester material.

11. The hood as claimed in claim 10 wherein there are two of said reinforcing strips.

12. The hood as claimed in claim 11 wherein said two reinforcing strips are joined together in the shape of a cross.

13. The hood as claimed in claim 12 wherein said two reinforcing strips are joined together with an adhesive.

14. The hood as claimed in claim 10 wherein said crown is formed of a first disk and a second disk joined together at a common perimeter, wherein said first disk and said second disk are fabricated of a see-through mesh material and are substantially equal in size, wherein said reinforcing means is captured between said first disk and said second disk.

15. The hood as claimed in claim 14 wherein said reinforcing means includes two reinforcing strips joined together in a cross pattern, wherein said reinforcing strips are fabricated of a solid woven polyester material.

16. A fabric device for shielding a user's face from insects and the like, said device comprising a hood conformable to a shape of said user's head, wherein said hood is fabricated primarily of mesh netting and having a top crown and a bottom opening, wherein affixed to said top crown are a plurality of strips, wherein said strips are made of a solid woven polyester material.

17. A protective hood to shield a wearer's head from insects, said hood comprising:

a. a lower hood section; and b. a crown section attached to an upper region of said lower hood section, wherein said crown section includes reinforcing means designed to cause said lower hood section to drape over a face of a wearer without contacting said face, said reinforcing means having a plurality of reinforcing strips formed in a crossing pattern such that a center of said crossing pattern is aligned approximately with a center of a head of said wearer when said hood is deployed, and said reinforcing strips are fabricated of a solid woven polyester material.

* * * * *